United States Patent
Pan et al.

(10) Patent No.: US 8,411,973 B2
(45) Date of Patent: Apr. 2, 2013

(54) IMAGE FILE PROCESSING METHOD

(75) Inventors: Chia-Ho Pan, Tainan (TW); Po-Jung Lin, Kaohsiung (TW); Shuei-Lin Chen, Kaohsiung (TW); Yen-Ping Teng, Tainan (TW); Kuo-Chun Hung, Hsinchu (TW)

(73) Assignee: Altek Corporation, Hsinchu (TW)

(*) Notice: Subject to any disclaimer, the term of this patent is extended or adjusted under 35 U.S.C. 154(b) by 122 days.

(21) Appl. No.: 13/196,657

(22) Filed: Aug. 2, 2011

(65) Prior Publication Data
US 2012/0281926 A1 Nov. 8, 2012

(30) Foreign Application Priority Data
May 6, 2011 (TW) ................................ 100116062

(51) Int. Cl.
*G06K 9/36* (2006.01)
*G06K 9/46* (2006.01)

(52) U.S. Cl. ...................................................... 382/233

(58) Field of Classification Search .................. 382/232, 382/233, 235, 246, 248, 250; 348/14.01–14.08
See application file for complete search history.

(56) References Cited

U.S. PATENT DOCUMENTS

| 7,480,418 | B2 | 1/2009 | Niemi et al. |
| 7,643,694 | B2* | 1/2010 | Srinidhi ........................ 382/250 |
| 7,800,642 | B2* | 9/2010 | Eshkoli et al. ............. 348/14.08 |
| 2012/0281926 | A1* | 11/2012 | Pan et al. ..................... 382/233 |

* cited by examiner

*Primary Examiner* — Amir Alavi
(74) *Attorney, Agent, or Firm* — Morris Manning & Martin LLP; Tim Tingkang Xia, Esq.

(57) ABSTRACT

A processing method for image file includes the following steps. An image file of an image is obtained, in which the image file includes a bit stream and an Exchangeable Image File (EXIF) data. A band indicator and a minimum coded unit (MCU) indicator are read according to an expanded range. A referential DC coefficient is obtained according to a hybrid direct current (DC) coefficient corresponding to a first MCU covered by the expanded range. A sub-clip of the MCU covered by the corresponding expanded range in the bit stream is decoded according to the read band indicator, the MCU indicator and the referential DC coefficient, so as to obtain at least one MCU.

9 Claims, 7 Drawing Sheets

FIG. 4

| 42 | 44 | 46 |
|----|----|----|
| 42 | 44 | 46 |
| 48 | | |
| 42 | 44 | 46 |
| 42 | 44 | 46 |

40

IMAGE FILE PROCESSING METHOD

CROSS-REFERENCE TO RELATED APPLICATIONS

This non-provisional application claims priority under 35 U.S.C. §119(a) on Patent Application No(s). 100116062 filed in Taiwan, R.O.C. on May 6, 2011, the entire contents of which are hereby incorporated by reference.

BACKGROUND OF THE INVENTION

1. Field of Invention

The present invention relates to an image file processing method, and more particularly to an image file decoding method.

2. Related Art

A digital camera uses a sensor to capture an image and converts the image into a digital signal to save the captured image into an digital image file format. Currently, one of the most popular image file format is Joint Photographic Experts Group (JPEG), and the JPEG format image file has been adopted by most digital cameras or other digital products.

After capturing an image, the user often browses the image files stored in the digital camera. However, no matter how high the resolution of the image stored in the digital camera is, the user can only view a reduced resolution image through a small-sized display screen. Therefore, when the user wants to clearly view a part of an image, the user needs to enlarge the image to view the details of the part of the image.

However, even if only a part of the image is expected to be enlarged and presented to the user, the direct processing method still needs to decode the entire image file to the full resolution and then display the part of the image designated by the user. This method requires a memory having an enough size for the full resolution image. Therefore, a large quantity of the memory size, the read and write bandwidth of the memory and the computation of decoding the image must be wasted. Along with the evolution of the day, the image resolution is improved quickly, which aggravates the overhead in decoding.

To reduce the required memory size, one choice is decoding a part of the image and displaying the part to the user. The relevant technique refers to the US Publication No. 7,480, 418. Compared with the original file, in the prior art, the size of the image file is increased due to the overhead, which causes the decrease of the data compression ratio. Moreover, the processed image file is inapplicable to the current universal decoder (for example, JPEG decoder), so most of the flexibility is lost.

SUMMARY OF THE INVENTION

Accordingly, the present invention is directed to an image file processing method, thereby solving the problem existing in the prior art that a partial range in the image cannot be decoded or the method of processing the image file needs large memory size, large memory access bandwidth and large computation ability when decoding the image, the extra overhead is heavy and/or the method is not applicable to the current decoder.

The image file processing method of the present invention is used to decode a partial range in an image.

First, an image file of an image is obtained. The image is divided into a plurality of image blocks, at least one image block is regarded as a minimum coded unit (MCU), and one row or multiple rows of MCUs sequentially define the image into a plurality of bands. The image file comprises a bit stream and an Exchangeable Image File (EXIF) data. The image file may be of a Joint Photographic Experts Group (JPEG) format.

The bit stream expresses compression data of an image in a Huffman coding manner. The bit stream has a plurality of clips respectively corresponding to the bands, in which each clip has a plurality of sub-clips. In each clip, the sub-clips respectively correspond to MCUs of the bands corresponding to the clips.

The EXIF data comprises a plurality of band indicators, a plurality of MCU indicators and a plurality of hybrid DC coefficients. The band indicators respectively correspond to the bands, and each band indicator indicates the position of the clip corresponding to the corresponding band in the bit stream. Likewise, the MCU indicators respectively correspond to the MCUs, and each MCU indicator indicates the position of the sub-clip corresponding to the corresponding MCU in the clip. The hybrid DC coefficients sequentially correspond to an image DC coefficient in each sub-clip. A DC table records the hybrid DC coefficient which is a differential DC coefficient or a non-differential DC coefficient. In addition, the EXIF may further comprise a shooting parameter when capturing an image.

Then, the image file processing method comprises the following steps. At least one band indicator and an MCU indicator are read according to an expanded range for selecting part of the image. A referential DC coefficient is obtained according to a hybrid DC coefficient corresponding to the first MCU covered by the expanded range. At least one sub-clip corresponding to at least one MCU covered by the expanded range in the bit stream is decoded according to the read band indicator, the MCU indicator and the referential DC coefficient, so as to obtain image data of at least one MCU.

The EXIF data may further comprise a DC table. The step of obtaining the referential DC coefficient according to the hybrid DC coefficient corresponding to the first MCU covered by the expanded range may comprise: looking up a DC table to determine whether the hybrid DC coefficient corresponding to the first MCU covered by the expanded range is the non-differential DC coefficient; when the hybrid DC coefficient corresponding to the first MCU covered by the expanded range is the non-differential DC coefficient, regarding the hybrid DC coefficient corresponding to the first MCU covered by the expanded range as the referential DC coefficient; and when the hybrid DC coefficient corresponding to the first MCU covered by the expanded range is the differential DC coefficient, searching forward for the non-differential DC coefficient which is closest to the hybrid DC coefficient corresponding to the first MCU covered by the expanded range to regard as a reference and calculating the referential DC coefficient corresponding to the first MCU.

The image file processing method may further comprise displaying an expanded range of the decoded MCU.

The band indicator may record a clip length of the corresponding clip or a clip start position of the corresponding clip in the bit stream. The MCU indicator may record a clip length of the corresponding sub-clip or a sub-clip start position of the corresponding sub-clip in the bit stream or the clip. The relative addresses or absolute addresses of the band indicators have the same length and/or the relative addresses or absolute addresses of the MCU indicators have the same length, so as to reduce the decoding difficulty and increase the image file processing speed.

In the hybrid DC coefficient of the EXIF, the differential DC coefficient is saved in less than 8 bits, and the non-differential DC coefficient may be saved in 8 to 16 bits.

Furthermore, the bit stream may additionally have a restart marker after every N sub-clips, and N is a positive integer. One non-differential DC coefficient is provided every N sub-clips. The value of the restart marker may be 0xFFD0 to 0xFFD7.

To enable the image file processing method widely used in the current encoders and decoders, the value of the restart marker in each clip may sequentially be 0xFFD0 to 0xFFD7. More specifically, every 8 consecutive bands are defined to be a large band. The values of the restart markers of the 8 clips corresponding to the large band may sequentially be 0xFFD0 to 0xFFD7. In the bit stream corresponding to each large band, the value of the first restart marker among the restart markers is 0xFFD0, which satisfies the limitation that some decoders require the value of the first restart marker must be 0xFFD0.

In view of the above, the image file processing method according to the present invention does not need decoding the entire image to the full resolution, thereby greatly saving the memory size, memory access bandwidth and computation ability required in decoding. In the image file processing method according to the present invention, the image file writes extra information required in partial decoding, such as the band indicators, in the EXIF data to be attached in the JPEG file, and the bit stream still compatible to the JPEG specification, so the method is compatible with the current JPEG decoders. Compared with the prior art, in the image file processing method according to the present invention, the extra overhead caused by the band indicator added in the EXIF data is small, so the image file has an excellent data compression ratio.

BRIEF DESCRIPTION OF THE DRAWINGS

The present invention will become more fully understood from the detailed description given herein below for illustration only, and thus are not limitative of the present invention, and wherein:

FIG. 4 is a schematic view of EXIF data according to an embodiment of the present invention;

DETAILED DESCRIPTION OF THE INVENTION

The image file processing method according to the present invention is used to decode a partial range of the image according to the expanded range, thereby displaying a part of the image marked by the expanded range. The image file processing method may process an image file of the image. The image file processing method may decode a part of the image file according to the expanded range (or may be referred to as the window of interest (WOI)), so as to obtain the partial image in the expanded range. The partial image file refers to a part of a single image file.

Figure 1:
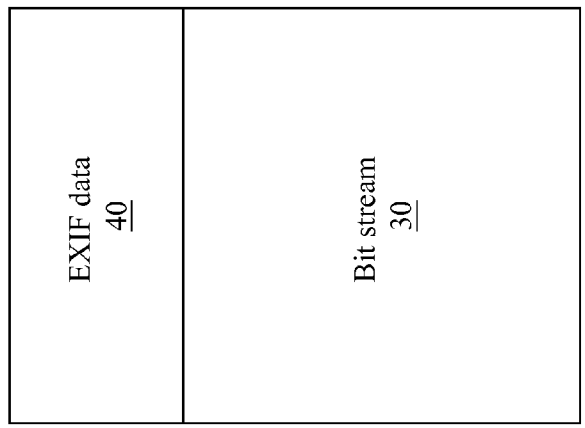
FIG. 1 is a schematic view of an image file according to an embodiment of the present invention.

FIG. 1 is a schematic view of an image file according to an embodiment of the present invention.

Referring to FIG. 1, the image file 20 comprises a bit stream 30 and an Exchangeable Image File (EXIF) data 40. The image file 20 may be of a Joint Photographic Experts Group (JPEG) format. However, the present invention is not limited to the JPEG format, and all the image files that can achieve the purpose are covered in the present invention.

Figure 2:
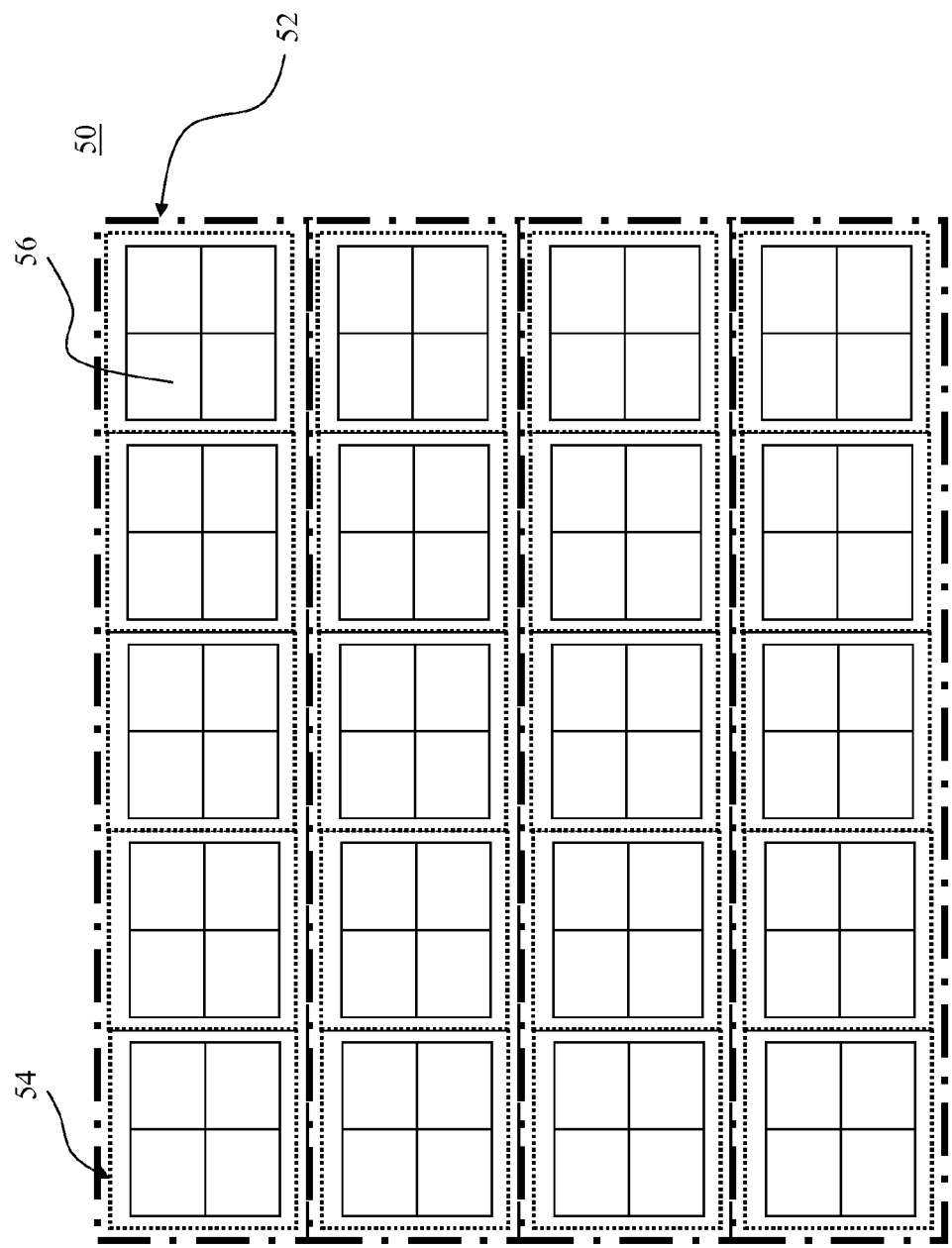
FIG. 2 is a schematic view of an image according to an embodiment of the present invention.
Figure 3:
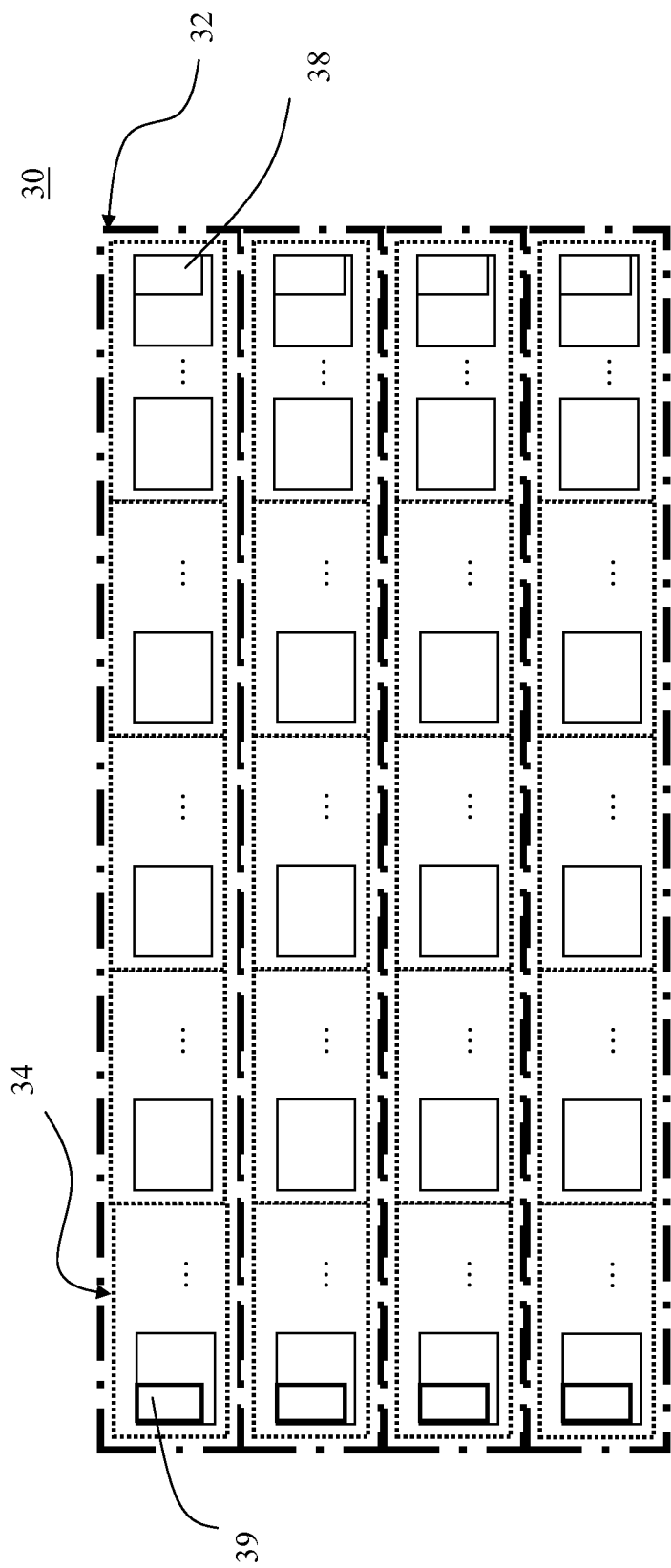
FIG. 3 is a schematic view of a bit stream according to an embodiment of the present invention.

FIG. 2 and FIG. 3 are respectively a schematic view of an image and a schematic view of a bit stream according to an embodiment of the present invention.

Referring to FIG. 2 and FIG. 3, the image 50 is divided into a plurality of consecutive image blocks 56, one or more image blocks 56 is regarded as a minimum coded unit (MCU) 54, and one row or multiple rows of the MCUs 54 sequentially define the image 50 into a plurality of bands 52. The size of the image block 56 may be, for example, 8*8 pixels.

The bit stream 30 may express the compression data of the image 50 in a Huffman coding manner. The image 50 may be expressed in a $YC_bC_r$ color space manner. Y, $C_b$ and $C_r$ in the $YC_bC_r$ color space respectively represent luminance (or referred to as brightness), blue chrominance (or referred to as chroma or saturation) and red chrominance of one pixel in the image 50. Each MCU 54 may be expressed to be at least one data unit by the color difference color space. Many methods have been proposed for sampling and coding the image 50 in the unit of the MCU 54. For example, the sampling manner of "4:2:0" represents one MCU 54 comprises 4 image blocks 56, and one MCU 54 is expressed by 6 data units which are the luminance of 4 image blocks 56 and blue chrominance and red chrominance between the image blocks 56.

In the JPEG image standard, each data unit after compression may be expressed by an image DC coefficient and 63 image AC coefficients. The bit stream 30 may comprise the image DC coefficient and the image AC coefficients of the data unit after the Huffman coding. The image DC coefficient in the bit stream 30 may be non-differential or differential. The non-differential image DC coefficient represents that the value of this DC coefficient is complete and independent, and the differential image DC coefficient records the difference between the image DC coefficients of the current data unit and the previous data unit.

Therefore, when decoding to obtain the complete value represented by one differential image DC coefficient, one closest non-differential image DC coefficient needs to be found with forward search, so the nearest non-differential image DC coefficient is used to calculate the complete DC value that represents the differential image DC coefficient.

The bit stream 30 has a plurality of clips 32 respectively corresponding to the bands 52 of the image 50, the clips 32 respectively correspond to the bands 52 in the image 50, and a plurality of sub-clips 34 in each clip 32 respectively correspond to the MCUs 54 in the band 52.

Furthermore, the bit stream 30 may further have a restart marker (Restart Marker, RSTm, or referred to as RM) 38 after every N sub-clips 34, and N is a positive integer. One non-differential DC coefficient 39 is provided at the start position of each clip 32, and the non-differential DC coefficient 39 corresponds to the first image block 56 of the clip 32. In other words, in the bit stream 30, one restart marker 38 is provided after every N sub-clips 34, and one non-differential DC coefficient 39 is provided at the start position of at least every N sub-clips 34. The value of the restart marker 38 may be one of 0xFFD0 to 0xFFD7.

Figure 4:
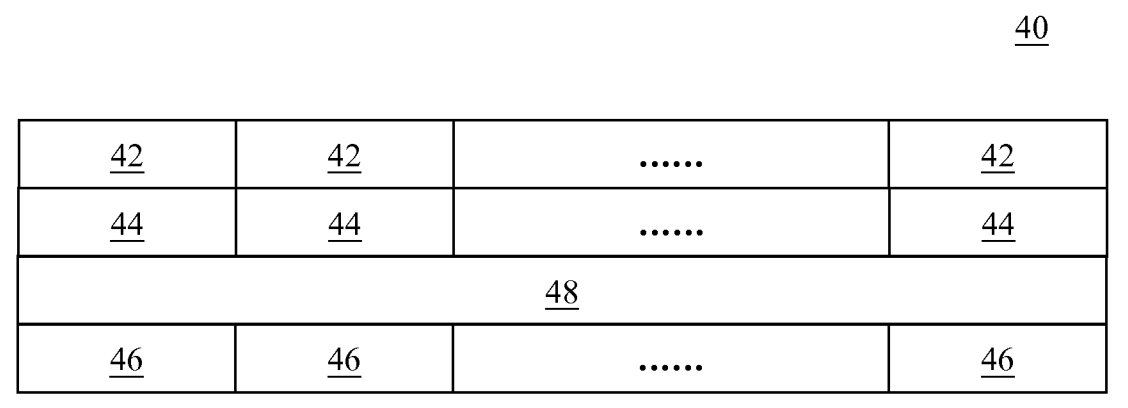

FIG. 4 is a schematic view of EXIF data according to an embodiment of the present invention. The EXIF data 40 of the image file 20 comprises a plurality of band indicators 42, a plurality of MCU indicators 44 and a plurality of hybrid DC coefficients 46. Furthermore, the EXIF data 40 may further comprise a DC table 48.

The band indicators 42 respectively correspond to the bands 52, and each band indicator 42 indicates the position of the clip 32 corresponding to the corresponding band 52 in the bit stream 30. Likewise, the MCU indicators 44 respectively correspond to the MCUs 54, and each MCU indicator 44 indicates the position of the sub-clip 34 corresponding to the corresponding MCU 54 in the clip 32.

The band indicator 42 may record a clip length of the corresponding clip 32 or a clip start position of the corresponding clip 32 in the bit stream 30. The MCU indicator 44 may record a sub-clip length of the corresponding sub-clip 34 or a sub-clip start position of the corresponding sub-clip 34 in the clip 32 or the bit stream 30. That is to say, the band indicator 42 or the MCU indicator 44 may address the corresponding band 52 or sub-clip 34 by way of recording the absolute address or relative address. The relative address can be recorded as different length by the recorded method. To reduce the decoding difficulty and increase the image file 20 processing speed, the relative addresses or absolute addresses of all the band indicators 42 may have the same length. Likewise, the relative addresses or absolute addresses of all the MCU indicators 44 may have the same length.

However, in the image file 20, the band indicator 42 or the MCU indicator 44 may address the corresponding clip 32 or sub-clip 34 by a hybrid use of the absolute address or relative address. As long as it is recorded in a bitmap manner, it may be deduced that the following band indicator 42/MCU indicator 44 adopts the absolute address or relative address. The length of the relative addresses or absolute addresses of the band indicators 42 or the MCU indicators 44 may also be different.

The hybrid DC coefficient 46 in the EXIF data 40 sequentially corresponds to the image DC coefficient in each sub-clip 34. The DC table 48 records the hybrid DC coefficient 46 which is a differential or non-differential DC coefficient. According to the present invention, the value of the hybrid DC coefficient 46 may be the same as the corresponding image DC coefficient, and may also be recorded as the differential DC coefficient according to the corresponding image DC coefficient in an object-based prediction manner.

In the object-based prediction manner, the object boundary has more apparent changes in the color or luminance as compared with other parts in the image 50. In other words, even for two consecutive MCUs 54, the difference between the values of the image DC coefficients of the MCU 54 at the object boundary and the MCU 54 not at the object boundary may be very different. Even if the image DC coefficient corresponding to the MCU 54 on the object boundary records the image DC coefficient in the differential manner, the required number of bit cannot be reduced. Therefore, the image file 20 records the hybrid DC coefficient 46 corresponding to MCU 54 at the object boundary in a non-differential manner.

Figures 5A, 5B:
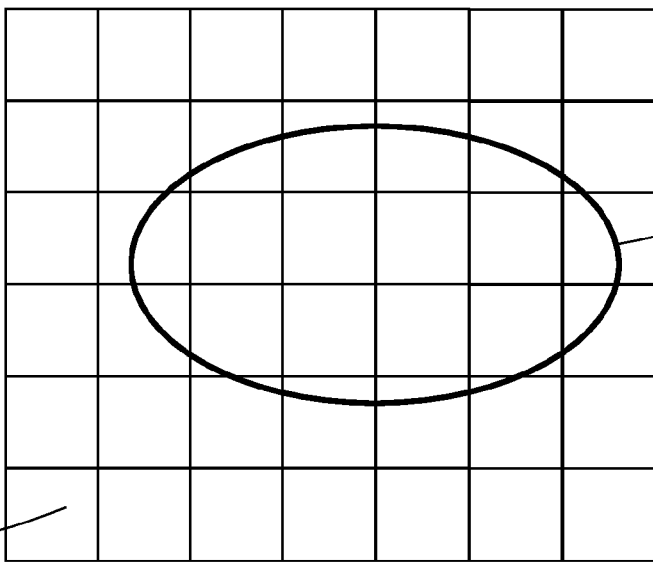
FIG. 5A is a schematic view of an object boundary according to an embodiment of the present invention.
FIG. 5B is a schematic view of a DC table corresponding to FIG. 5A.

FIG. 5A is a schematic view of an object boundary according to an embodiment of the present invention. FIG. 5B is a schematic view of a DC table corresponding to FIG. 5A.

Referring to FIG. 5A and FIG. 5B, in the image 50, the object boundary 58 covers partial MCUs 54. The DC table 48 records if the MCU 54 is covered by the object boundary 58. For example, in the DC table 48, "1" expresses the MCU 54 is covered by the object boundary 58, and the hybrid DC coefficient 46 corresponding to the MCU 54 is non-differential. On the contrary, "0" expresses the MCU 54 is not covered by the object boundary 58, and the hybrid DC coefficient 46 corresponding to the MCU 54 is differential.

The non-differential DC coefficient 39 (that is, the non-differential hybrid DC coefficient 46) may be saved in 8 to 16 bits, and the differential DC coefficient (that is, the differential hybrid DC coefficient 46) may be saved in less than 8 bits.

In addition, the EXIF may further comprise a shooting parameter when capturing the image. The shooting parameter may be a camera model, a focal length, a shooting time, an exposure time, an f-number, a photosensitivity, or a metering.

When coding the image file 20 that is applicable to the present invention, each band 52 and MCU 54 may be processed one after another. When the encoder generates the bit stream 30, after the sub-clips 34 corresponding to N MCUs 54 are coded, a restart marker 38 is added. Every N MCUs 54 may be a band 52. After the encoder generates one sub-clip 34, the MCU indicator 44 corresponding to the generated sub-clip 34 is calculated and is saved in the EXIF data 40. Likewise, along with the coding the band 52 into the clip 32, the encoder calculates the corresponding band indicator 42 and writes in the EXIF data 40. The DC table 48 is gradually filled by the encoder corresponding to each generated MCU 54 in an object-based prediction manner.

Figure 6:
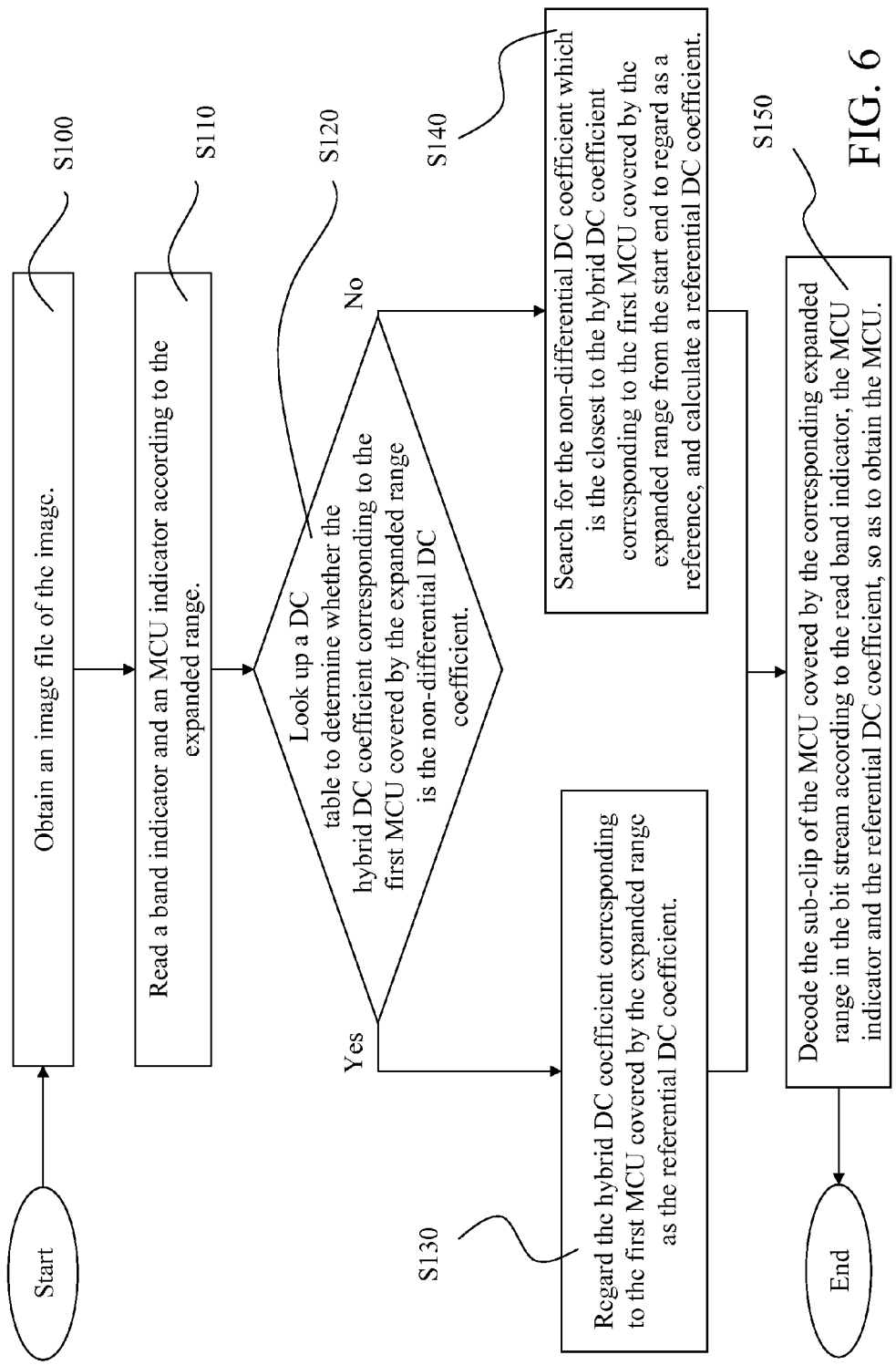
FIG. 6 is a flow chart of an image file processing method according to an embodiment of the present invention.
Figure 7:
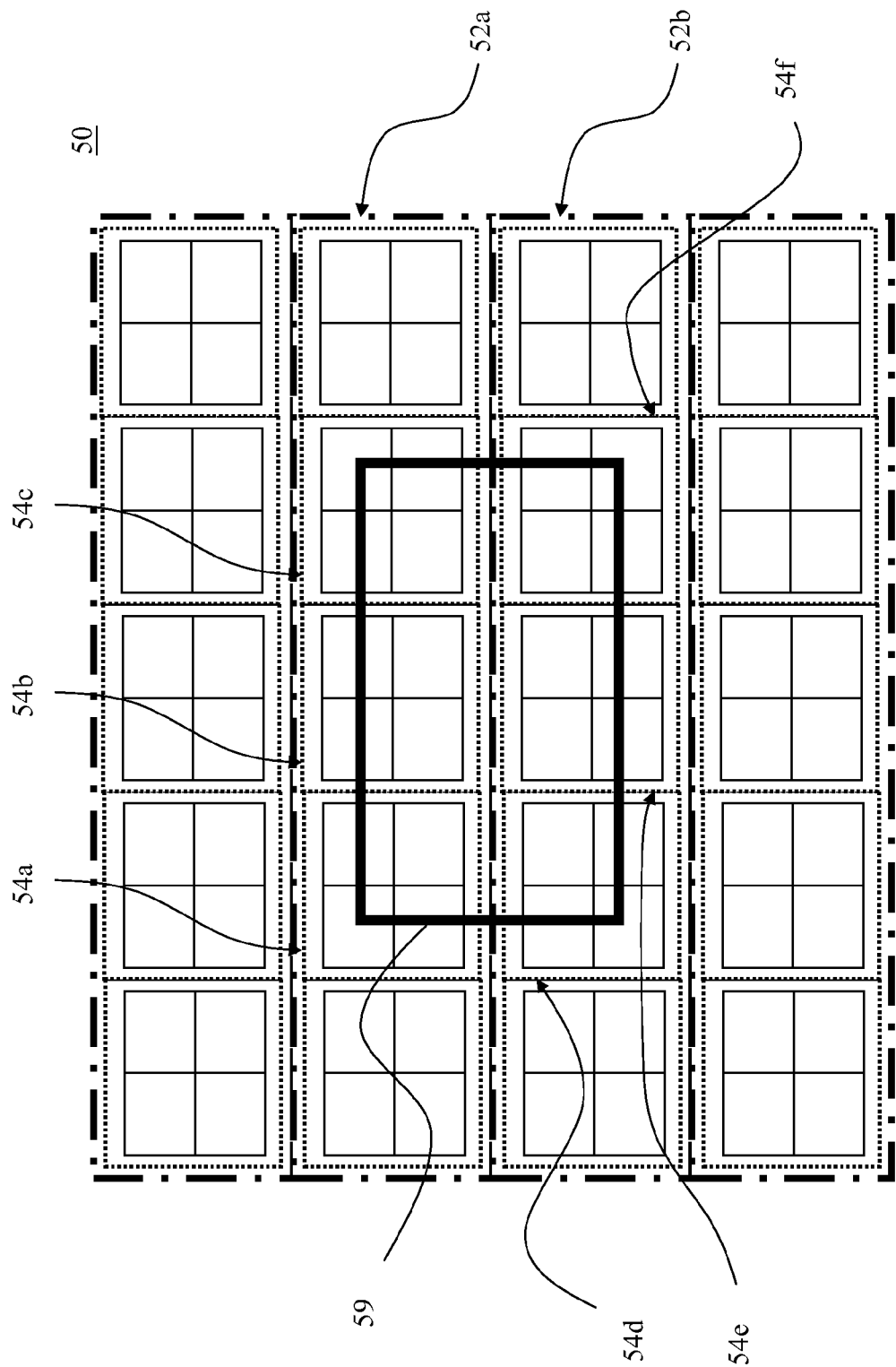
FIG. 7 is a schematic view of an expanded range according to an embodiment of the present invention.

FIG. 6 and FIG. 7 are respectively a flow chart of an image file processing method and a schematic view of an expanded range according to an embodiment of the present invention. Hereinafter, the step of processing the image file 20 in the image file processing method of the present invention is described in details in FIG. 6 and FIG. 7. The image file processing method may decode the partial bit stream 30 according to the expanded range 59 to obtain a partial image in the expanded range 59.

First, the compressed image file 20 of the image 50 is provided (step S100), and the expanded range 59 is marked. The expanded range 59 may be designated by the user, and the expanded range 59 covers one or more MCUs 54. For example, in FIG. 7, the expanded range 59 covers the bands 52a and 52b, and covers the MCUs 54a, 54b, 54c, 54d, 54e and 54f. The MCU 54a is referred to an initial MCU of the expanded range 59.

Then, according to the expanded range 59, in the EXIF data 40, the band indicator 42 corresponding to the band 52 covered by the expanded range 59 and the MCU indicator 44 corresponding to the MCU 54 covered by the expanded range 59 are read (step S110). In the image file processing method, firstly, according to the expanded range 59, it is determined which band(s) 52 and MCU(s) 54 in the image 50 is/are covered by the expanded range 59. Therefore, in step S110, the band indicators 42 corresponding to the bands 52a and 52b and the MCU indicators 44 corresponding to the MCUs 54a, 54b, 54c, 54d, 54e and 54f are read to obtain the positions of the sub-clips 34 corresponding to the MCUs 54a, 54b, 54c, 54d, 54e and 54f in the bit stream 30.

By the band indicators 42 and the MCU indicators 44, the method for searching for the absolute position of the sub-clips 34 corresponding to the MCUs 54 in the bit stream 30 for example has the following two methods.

In the first method, when the band indicator 42 records the clip start position of the corresponding clip 32 in the bit stream 30, the band indicators 42 of the corresponding bands 52a and 52b are read to directly obtain the absolute position of the clip 32 corresponding to the bands 52a and 52b in the bit stream 30. When the MCU indicator 44 records the sub-clip start position of the corresponding sub-clip 34 in the bit stream 30 or the clip 32, the MCU indicators 44 corresponding to the MCUs 54a, 54b, 54c, 54d, 54e and 54f are read to obtain the absolute position of the sub-clips 34 corresponding to the MCUs 54 in the bit stream 30.

In the second method, when the band indicator 42 records a clip length of the corresponding clip 32 (regarded as the relative position of the corresponding clip 32 in the bit stream 30), all the band indicators 42 before the band indicator 42 corresponding to the band 52a are read and are accumulated to obtain the absolute positions of the clips 32 corresponding to the bands 52a and 52b in the bit stream 30. Likewise, when the MCU indicator 44 records a sub-clip length of the corresponding sub-clip 34 (regarded as the relative position of the corresponding sub-clip 34 in the clip 32), at least one MCU indicator 44 probably needs to be accumulated.

Therefore, according to the above method, by the band indicator 42 and MCU indicator 44, it may be obtained at which bit address of the corresponding sub-clip 34 starts in bit stream 30.

Then, according to a hybrid DC coefficient 46 corresponding to the first MCU 54 covered by the expanded range 59 (that is, the initial MCU), a referential DC coefficient is obtained. According to an embodiment of the present invention, the step may comprise the following step S120, step S130 and step S140. The image file processing method may look up the DC table 48 to determine whether the hybrid DC coefficient 46 corresponding to the first MCU 54 covered by the expanded range 59 is the non-differential DC coefficient 39 (step S120).

When the hybrid DC coefficient 46 corresponding to the first MCU 54 covered by the expanded range 59 is the non-differential DC coefficient 39, the hybrid DC coefficient 46 corresponding to the first MCU 54 covered by the expanded range 59 is regarded as the referential DC coefficient (step S130).

Then, according to the read band indicator 42, the MCU indicator 44 and the referential DC coefficient, the sub-clip 34 of the MCU 54 covered by the corresponding expanded range 59 in the bit stream 30 is decoded to obtain a partial image of at least one MCU 54 (step S150).

According to the read band indicator 42 and MCU indicator 44, the corresponding clip 32 and sub-clip 34 may be found. The initial MCU covered by the expanded range 59 may be directly used to obtain the non-differential DC coefficient 39. Therefore, when decoding in step S150, all the sub-clips 34 before the sub-clip 34 corresponding to the expanded range 59 in the bit stream 30 are not required to be decoded. After the non-differential DC coefficient 39 of the initial MCU of the expanded range 59 is obtained, the sub-clip 34 corresponding to the expanded range 59 is decoded according to the non-differential DC coefficient 39.

In the sub-clip 34 corresponding to the expanded range 59, the decoded first data unit corresponding to the expanded range 59 uses the non-differential image DC coefficient. According to the JPEG decoding manner, the relevant data unit is decoded. Therefore, only the relevant sub-clip 34 corresponding to the expanded range 59 in the entire bit stream 30 is decoded to obtain the MCU 54 covered by the expanded range 59.

On the contrary, when the hybrid DC coefficient 46 corresponding to the first MCU 54 covered by the expanded range 59 is the differential DC coefficient, the MCU 54 covered by the expanded range 59 cannot be directly obtained by the above method. In the DC table 48, the non-differential DC coefficient 39 which is the closest to the hybrid DC coefficient 46 from the forward search corresponding to the first MCU 54 covered by the expanded range 59 is searched and regarded as a reference, and a referential DC coefficient corresponding to the first MCU 54 is calculated (step 140). After the referential DC coefficient is obtained, the step S150 is carried out to decode the sub-clip 34 corresponding to the expanded range 59.

Furthermore, the image file processing method may further comprise displaying the expanded range 59 of the decoded MCU 54. That is to say, only the partial image of the decoded MCU 54 circled by the expanded range 59 is displayed for the user to browse.

However, some of the current decoders can only identify the value of the first executed restart marker 38 as 0xFFD0. To enable the image file processing method widely applied in the current decoders, 8 consecutive bands 52 are defined to be a large band. The value of the restart markers 38 in the 8 clips 32 corresponding to the large band may sequentially be 0xFFD0, 0xFFD1, 0xFFD2, 0xFFD3, 0xFFD4, 0xFFD5, 0xFFD6 and 0xFFD7. In this manner, with the unit of the large band, it is avoided that the first executed restart marker 38 identifiable by some current decoders with insufficient flexibility can only be 0xFFD0.

In view of the above, according to the image file processing method of the present invention, the band indicator, the MCU indicator, the DC table and the hybrid DC coefficient written in the EXIF data are read, and only the MCUs covered by the expanded range and the sub-clips of the bit stream corresponding to a few of the MCUs before the expanded range are decoded. Therefore, according to the image file processing method of the present invention, the entire image does not need to be decoded to the full resolution, and thus the memory size, memory access bandwidth and computation ability required for decoding can be saved, thereby greatly improving the time for partially decoding the image and reducing the cost for processing the image.

Then, in the image file processing method according to the present invention, the image file writes extra information required in decoding the parts comprising the band indicators in the EXIF data to be attached in the JPEG file, and the bit stream is still compatible to the JPEG specification. Therefore, the image file of the present invention is compatible with the current JPEG decoder, so the feasibly is improved. Compared with the prior art, according to the image file processing method of the present invention, the extra overhead caused by the band indicator added in the EXIF data is small, so the image file has an excellent data compression ratio.

What is claimed is:
1. An image file processing method, comprising:
obtaining an image file of an image, wherein the image is divided into a plurality of image blocks, at least one of the image blocks is regarded as a minimum coded unit (MCU), one row or multiple rows of the MCUs sequentially defines the image into a plurality of bands, wherein the image file comprises:
a bit stream, indicating a compression data of the image and having a plurality of clips respectively corresponding to the bands, wherein each clip has a plurality of sub-clips, and in each clip, the sub-clips respectively correspond to the MCUs of the bands corresponding to the clips; and
an Exchangeable Image File (EXIF) data, comprising:
a plurality of band indicators, respectively corresponding to the bands, and each indicating a position of the clip corresponding to the band in the bit stream;
a plurality of MCU indicators, respectively corresponding to the MCUs, and each indicating a position of the sub-clip corresponding to the MCU in the clip; and a plurality of hybrid direct current (DC) coefficients, sequentially corresponding to an image DC coefficient of each sub-clip;

reading at least one of the band indicators and the MCU indicator according to an expanded range for selecting part of the image;

obtaining a referential DC coefficient according to the hybrid DC coefficient corresponding to the first MCU covered by the expanded range; and decoding at least one sub-clip corresponding to at least one MCU covered by the expanded range in the bit stream according to the read band indicator, the MCU indicator and the referential DC coefficient, so as to obtain at least one of the MCU.

2. The image file processing method according to claim 1, further comprising:

displaying part of the image in the expanded range of the corresponding decoded MCU in the image.

3. The image file processing method according to claim 1, wherein the image file further comprises a DC table, for recording the hybrid DC coefficients as a differential DC coefficient or a non-differential DC coefficient; and the step of obtaining the referential DC coefficient according to the hybrid DC coefficient corresponding to the first MCU covered by the expanded range comprises:

looking up the DC table to determine whether the hybrid DC coefficient corresponding to the first MCU covered by the expanded range is the non-differential DC coefficient;

regarding the hybrid DC coefficient corresponding to the first MCU covered by the expanded range as the referential DC coefficient, when the hybrid DC coefficient corresponding to the first MCU covered by the expanded range is the non-differential DC coefficient; and searching forward for the non-differential DC coefficient which is closest to the hybrid DC coefficient corresponding to the first MCU covered by the expanded range to regard as a reference and calculating the referential DC coefficient, when the hybrid DC coefficient corresponding to the first MCU covered by the expanded range is the differential DC coefficient.

4. The image file processing method according to claim 1, wherein the band indicator records a clip length of the corresponding clip and the MCU indicator records an MCU length of the corresponding MCU.

5. The image file processing method according to claim 1, wherein the band indicator records a clip start position of the corresponding clip in the bit stream and the MCU indicator records a sub-clip start position of the corresponding sub-clip in the bit stream.

6. The image file processing method according to claim 1, wherein the differential DC coefficients are saved in less than 8 bits and the non-differential DC coefficient is saved in 8 to 16 bits.

7. The image file processing method according to claim 1, wherein every 8 consecutive bands is defined to be a large band, and in the bit stream corresponding to each large band, a value of the first restart marker of a plurality of restart markers is 0xFFD0.

8. The image file processing method according to claim 1, wherein relative addresses or absolute addresses of the band indicators have the same length.

9. The image file processing method according to claim 1, wherein relative addresses or absolute addresses of the MCU indicators have the same length.

* * * * *